(12) United States Patent
Allen et al.

(10) Patent No.: US 10,656,991 B2
(45) Date of Patent: May 19, 2020

(54) ELECTRONIC COMPONENT HAVING REDUNDANT PRODUCT DATA STORED EXTERNALLY

(71) Applicant: INTERNATIONAL BUSINESS MACHINES CORPORATION, Armonk, NY (US)

(72) Inventors: Corville O. Allen, Morrisville, NC (US); Lee N. Helgeson, Rochester, MN (US); Jenny S. Li, Danbury, CT (US); Philip J. Sanders, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 244 days.

(21) Appl. No.: 14/833,158

(22) Filed: Aug. 24, 2015

(65) Prior Publication Data

US 2017/0060709 A1    Mar. 2, 2017

(51) Int. Cl.
*G06F 11/00* (2006.01)
*G06F 11/08* (2006.01)
*G06F 11/16* (2006.01)
*G06F 11/20* (2006.01)

(52) U.S. Cl.
CPC .......... *G06F 11/08* (2013.01); *G06F 11/1662* (2013.01); *G06F 11/1666* (2013.01); *G06F 11/2069* (2013.01); *G06F 2201/805* (2013.01)

(58) Field of Classification Search
CPC ............ G06F 11/1666; G06F 11/1469; G06F 11/1451; G06F 11/1458; G06F 16/122; G06F 3/0619; G06F 9/44505; G06F 11/14; G06F 16/2365; G06F 21/60; G06F 2201/83; H04L 67/325; H04L 69/40
See application file for complete search history.

(56) References Cited

U.S. PATENT DOCUMENTS

| 6,055,581 | A | * | 4/2000 | Berglund | .............. | G06F 13/387 |
| | | | | | | 710/11 |
| 6,374,269 | B1 | * | 4/2002 | Ishikawa | .............. | G06F 11/1076 |

(Continued)

OTHER PUBLICATIONS

Disclosed Anonymously "Acquisition of device diagnostics and log data from Medical or Consumer Devices using NFC", ip.com No. 000214490; ip.com Electronic Publication dated Jan. 31, 2012; 5 pgs.

(Continued)

*Primary Examiner* — Loan L. T. Truong
(74) *Attorney, Agent, or Firm* — Cantor Colburn LLP; William Kinnaman

(57) ABSTRACT

Embodiments include method, systems and computer program products for redundantly storing product data for an electronic component on an external device. Aspects include determining that product data stored in a primary storage device is corrupted and determining whether the product data is available on the external device that is in communication with the electronic component. Based on a determination that the product data stored in the primary storage device is corrupted and that the product data is available on the external device, aspects include obtaining product data from the external device to continue operation of the electronic component.

17 Claims, 4 Drawing Sheets

(56) References Cited

U.S. PATENT DOCUMENTS

| | | | | |
|---|---|---|---|---|
| 6,851,073 B1* | 2/2005 | Cabrera | G06F 11/1417 | 714/15 |
| 7,092,702 B2* | 8/2006 | Cronin | G06F 8/65 | 455/418 |
| 7,103,743 B2* | 9/2006 | Goldschmidt | G06F 9/52 | 711/154 |
| 7,107,483 B2* | 9/2006 | Duncan | G06F 11/2025 | 711/152 |
| 7,143,253 B2* | 11/2006 | Kawamura | G06F 11/2074 | 707/999.202 |
| 7,177,774 B1* | 2/2007 | Brown | G06Q 10/06 | 702/182 |
| 7,216,209 B2* | 5/2007 | Kasako | G06F 11/2058 | 707/999.2 |
| 7,373,470 B2* | 5/2008 | Ninose | G06F 11/2058 | 711/114 |
| 7,376,761 B2* | 5/2008 | Dubal | G06F 1/24 | 710/8 |
| 7,461,226 B2* | 12/2008 | Iwamura | G06F 11/2058 | 707/999.202 |
| 7,472,173 B2* | 12/2008 | Maruyama | G06F 11/2064 | 709/202 |
| 7,484,116 B2* | 1/2009 | Brey | G06F 11/1666 | 711/100 |
| 7,552,358 B1* | 6/2009 | Asgar-Deen | G06F 11/1435 | 714/15 |
| 7,568,123 B2* | 7/2009 | Goodman | G06F 11/1456 | 714/6.3 |
| 7,590,883 B2* | 9/2009 | Engle | G06F 11/2289 | 714/6.32 |
| 7,702,852 B2* | 4/2010 | Kawaguchi | G06F 11/004 | 711/114 |
| 7,752,485 B2* | 7/2010 | Bavaria | G06F 9/44505 | 714/2 |
| 8,196,143 B2* | 6/2012 | Bavaria | G06F 9/4411 | 718/104 |
| 8,347,151 B2* | 1/2013 | Dawson | G06F 11/1464 | 714/42 |
| 8,615,680 B2* | 12/2013 | Boecker | G06F 11/1092 | 714/6.24 |
| 8,639,970 B2* | 1/2014 | Batwara | G06F 11/167 | 714/6.2 |
| 8,676,760 B2* | 3/2014 | Shen | G06F 11/2028 | 707/640 |
| 8,825,932 B1* | 9/2014 | Day, Jr. | G07G 1/0081 | 710/104 |
| 8,880,801 B1* | 11/2014 | Robins | G06F 12/0246 | 711/114 |
| 8,923,112 B2* | 12/2014 | Farkas | H04L 45/00 | 370/217 |
| 9,332,405 B2* | 5/2016 | Wang | H04W 4/12 | |
| 9,406,085 B1* | 8/2016 | Hunt, III | G06Q 40/025 | |
| 9,489,270 B2* | 11/2016 | Anglin | G06F 11/1458 | |
| 9,853,959 B1* | 12/2017 | Kapczynski | H04L 63/08 | |
| 9,880,756 B2* | 1/2018 | Mutalik | G06F 17/30162 | |
| 9,892,045 B1* | 2/2018 | Douglis | G06F 12/0833 | |
| 9,977,716 B1* | 5/2018 | Payne | G06F 11/1451 | |
| 10,387,179 B1* | 8/2019 | Hildebrant | G06F 9/5044 | |
| 2002/0019225 A1* | 2/2002 | Miyashita | H04L 12/585 | 455/412.2 |
| 2003/0014605 A1* | 1/2003 | Slater | G06F 11/1456 | 711/162 |
| 2003/0043647 A1* | 3/2003 | Kanamori | G06F 11/1068 | 365/200 |
| 2003/0135514 A1* | 7/2003 | Patel | G06F 11/1076 | |
| 2003/0158870 A1* | 8/2003 | Goodman | G06F 16/2365 | |
| 2003/0163777 A1* | 8/2003 | Holt | G06F 11/1004 | 714/763 |
| 2004/0034808 A1* | 2/2004 | Day, III | G06F 11/2058 | 714/6.23 |
| 2004/0153717 A1* | 8/2004 | Duncan | G06F 11/2069 | 714/6.23 |
| 2004/0153719 A1* | 8/2004 | Achiwa | G06F 11/2041 | 714/6.32 |
| 2004/0215569 A1* | 10/2004 | Agha | G06F 21/73 | 705/57 |
| 2004/0260726 A1* | 12/2004 | Hrle | G06F 11/1466 | |
| 2005/0038968 A1* | 2/2005 | Iwamura | G06F 11/2058 | 711/162 |
| 2006/0129613 A1* | 6/2006 | Goodman | G06F 11/1456 | |
| 2008/0126522 A1* | 5/2008 | Anna | H04L 67/1095 | 709/223 |
| 2009/0083120 A1* | 3/2009 | Strichman | G06Q 10/00 | 705/7.35 |
| 2009/0210589 A1* | 8/2009 | Horvath | G06F 9/4411 | 710/62 |
| 2009/0282416 A1* | 11/2009 | Bavaria | G06F 9/4401 | 718/104 |
| 2010/0077165 A1* | 3/2010 | Lu | G06F 11/1451 | 711/162 |
| 2010/0094949 A1* | 4/2010 | Goodman | G06F 11/1464 | 709/213 |
| 2010/0122324 A1* | 5/2010 | Welingkar | G06F 21/88 | 726/5 |
| 2011/0004586 A1* | 1/2011 | Cherryholmes | G06F 11/1469 | 707/682 |
| 2011/0010743 A1* | 1/2011 | Fournier | H04L 29/06027 | 725/62 |
| 2011/0029809 A1* | 2/2011 | Dhuse | G06F 11/1076 | 714/6.1 |
| 2011/0246627 A1* | 10/2011 | Kern | G06F 9/5072 | 709/220 |
| 2012/0296882 A1* | 11/2012 | Lee | G06F 17/30147 | 707/693 |
| 2013/0010959 A1* | 1/2013 | Shih | G06F 1/1632 | 380/270 |
| 2013/0067134 A1 | 3/2013 | Austen et al. | | |
| 2013/0212068 A1* | 8/2013 | Talius | G06F 17/30088 | 707/639 |
| 2013/0282662 A1* | 10/2013 | Kumarasamy | G06F 17/30289 | 707/649 |
| 2014/0064694 A1* | 3/2014 | Zealer | H04N 5/76 | 386/230 |
| 2014/0092422 A1* | 4/2014 | Shima | G06F 3/1204 | 358/1.14 |
| 2014/0149684 A1* | 5/2014 | Lee | G06F 12/0875 | 711/141 |
| 2014/0215171 A1* | 7/2014 | Daly, Jr. | G06F 21/6272 | 711/162 |
| 2014/0289202 A1* | 9/2014 | Chan | G06F 9/54 | 707/652 |
| 2014/0298485 A1* | 10/2014 | Gardner | G06F 9/4411 | 726/27 |
| 2015/0120862 A1* | 4/2015 | Erickson | G06F 11/1435 | 709/216 |
| 2017/0019551 A1* | 1/2017 | Ge | H04N 1/00941 | |
| 2017/0060672 A1 | 3/2017 | Allen et al. | | |
| 2017/0060709 A1* | 3/2017 | Allen | G06F 11/08 | |
| 2017/0123712 A1* | 5/2017 | Li | G06F 3/0641 | |
| 2017/0300307 A1* | 10/2017 | Chan | G06F 9/54 | |

OTHER PUBLICATIONS

List of IBM Patents or Patent Applications Treated as Related—Date Filed: Oct. 28, 2015; 2 pages.

U.S. Appl. No. 14/923,911, filed Oct. 27, 2015; Entitled: Electric Component Having Redundant Product Data Stored Externally.

* cited by examiner

ELECTRONIC COMPONENT HAVING REDUNDANT PRODUCT DATA STORED EXTERNALLY

BACKGROUND

The present disclosure relates to computer system maintenance and more specifically, to methods, systems and computer program products for redundantly storing product data for electronic components on an external device.

Computer systems are composed of many components, namely, circuit boards or parts that can be easily removed from the computer system and replaced, even by someone lacking in-depth product knowledge of the computer system. These components typically include one or more of power supply units, motherboards, socketed microprocessors, primary storage modules (e.g., Random Access Memories, or RAMs), secondary storage devices (e.g., hard drives and optical drives), video cards, sound cards, and peripherals such as keyboards, mice and printers.

Many of these components have Vital Product Data (VPD) stored thereon that is used during the setup or configuration of the computer system. The VPD is a collection of configuration and informational data associated with a particular set of hardware (e.g., a component), to allow for the component to be administered at a system or network level. VPD may include product model numbers, unique serial numbers, product release levels, maintenance levels, and other information specific to the hardware, as well as user-defined information, such as the building and department location of the hardware.

Currently, if the VPD of a component is corrupted, the component cannot be used even if the physical hardware of the component is functioning properly. In addition, since the VPD is not replaceable, users need to buy a new component if the VPD becomes corrupted. While existing mechanisms to protect VPD are available, most require the addition of redundant hardware to the component that increases the cost of the component.

SUMMARY

In accordance with an embodiment, a method for redundantly storing product data for an electronic component on an external device is provided. The method includes determining that product data stored in a primary storage device is corrupted and determining whether the product data is available on the external device that is in communication with the electronic component. Based on a determination that the product data stored in the primary storage device is corrupted and that the product data is available on the external device, the method also includes obtaining product data from the external device to continue operation of the electronic component.

In accordance with another embodiment, a system for redundantly storing product data for an electronic component on an external device includes a processor disposed on the electronic component. The processor configured to determine that product data stored in a primary storage device of the electronic component is corrupted and to determine whether the product data is available on the external device, wherein the external device is in communication with the electronic component. Based on a determination that the product data stored in the primary storage device is corrupted and that the product data is available on the external device, the processor is further configured to obtain product data from the external device to continue operation of the electronic component.

In accordance with a further embodiment, a computer program product for redundantly storing product data for an electronic component on an external device includes a non-transitory storage medium readable by a processing circuit and storing instructions for execution by the processing circuit for performing a method. The method includes determining that product data stored in a primary storage device is corrupted and determining whether the product data is available on the external device that is in communication with the electronic component. Based on a determination that the product data stored in the primary storage device is corrupted and that the product data is available on the external device, the method also includes obtaining product data from the external device to continue operation of the electronic component.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for redundantly storing product data for an electronic component on an external device are provided. In exemplary embodiments, a primary copy of the product data is stored in a primary storage device disposed on the electronic component. As used herein the term product data includes VPD and/or first failure data capture (FFDC). The product data is typically stored on a non-volatile memory of the electronic component, such as electrically erasable read-only memory (EEROM). In exemplary embodiments, the product data is also stored on an external device that is configured to communicate, either via a wired or wireless communications channel, with the electronic component. In exemplary embodiments, upon determining that the product data stored on the primary storage device is corrupt, the electronic component can access the product data stored on the external device to allow the continued use of the electronic component. Having a secondary source to access product data allows for the use of an electronic component with corrupt product data in the primary storage device until the product data in the primary storage device can be repaired.

Figure 1:
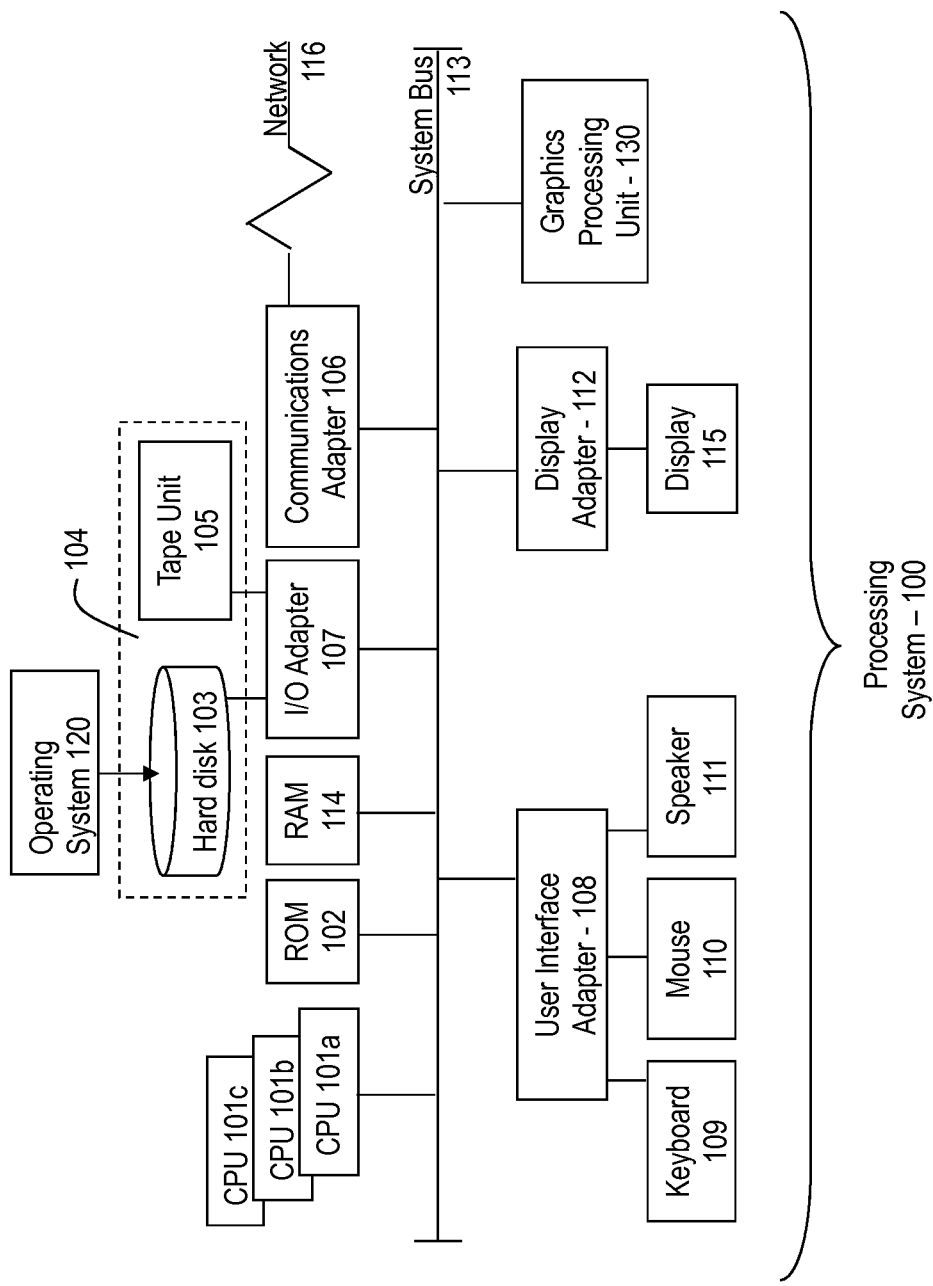
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
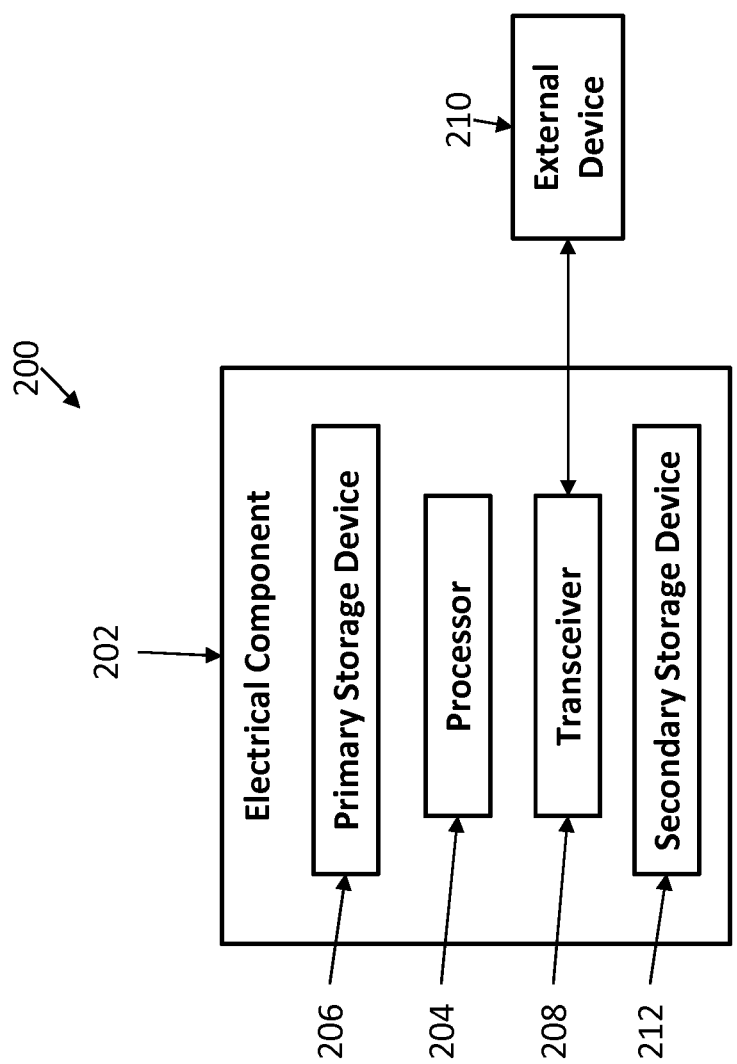
FIG. 2 is a block diagram illustrating a system for redundantly storing product data for an electronic component on an external device in accordance with an exemplary embodiment.

Referring now to FIG. 2, a system 200 for redundantly storing product data for an electronic component on an external device is illustrated. As illustrated, the system 200 includes an electronic component 202 which has a processor 204, a primary storage device 206, a transceiver 208 and a secondary storage device 212. In exemplary embodiments, the primary storage device 206 is a non-volatile memory that is configured to store product data that corresponds to the electronic component 202. The product data may include Vital Product Data (VPD) and/or First Failure Data Capture (FFDC) that can be generated by the failure of the electronic component 202. In exemplary embodiments, during initialization, or startup of the electronic component 202 the processor 204 reads the product data from the primary storage device 206 and uses the product data to configure or provision the electronic component 202. In exemplary embodiments, configuring or provisioning the electronic component 202 may include providing the product data to other electronic components.

In exemplary embodiments, when the processor 204 is unable to read the product data from the primary storage device 206 because the product data has become corrupted, the processor 204 is configured to communicate with the external device 210 via the transceiver 208 to obtain the product data. In one embodiment, the product data can be backed up from the electronic component 202 to the external device 210 when the product data is not corrupted. In another embodiment, the product data can be loaded onto the external device 210 when it is discovered that the product data is not corrupted. For example, the external device 210 may be configured to access a product data repository maintained by a manufacturer of the electronic component 202. Optionally, the electronic component 202 may be configured to store a temporary copy of the received product data from the external device 210 in the secondary storage device 212.

In exemplary embodiments, the external device 210 may be a smartphone, a tablet, a laptop computer or the like. In exemplary embodiments, the external device 210 and the transceiver 208 may be configured to communicate with each other via any suitable wireless communications protocol including, but not limited to, near field communications (NFC), Bluetooth, WiFi, or the like. The external device 210 may be configured to store product data received from a plurality of electronic components 202 and may be configured to download product data for identified electronic components 202 from the Internet. In exemplary embodiments, the communications between the external device 210 and the transceiver 208 is secured, i.e., encrypted, and access to the external device 210 may be restricted, i.e., the external device 210 may be password protected.

In exemplary embodiments, upon a determination that the product data stored in the primary storage device 206 is corrupted, the processor 204 may provide an indication that the product data is corrupted, which in turn can be used to initiate a service call to repair or replace the electronic component 202. In exemplary embodiments, the electronic component 202 can continue to be operated by accessing the redundantly stored product data until a new part is available or until a repair is performed. In exemplary embodiments, the use of the redundantly stored product data may be limited to a temporary use. For example, the processor 204 may be configured to only allow the operation of the electronic component 202 based on the use of the product data received from the external device 210 for a predetermined time period, i.e., one week, ten days, one month, or the like since it was determined that the product data in the primary storage device 206 was corrupted.

In exemplary embodiments, when an electronic component 202 fails it is desirable to obtain First Failure Data Capture (FFDC) from the electronic component 202. In exemplary embodiments, the electronic component 202 may be configured to store FFDC in the secondary storage device 212, which may accessible by the external device 210 via the transceiver 208 after the failure of the electronic component 202. The FFDC may include, but is not limited to, boot traces, core dumps, stack traces, registers and registries.

Figure 3:
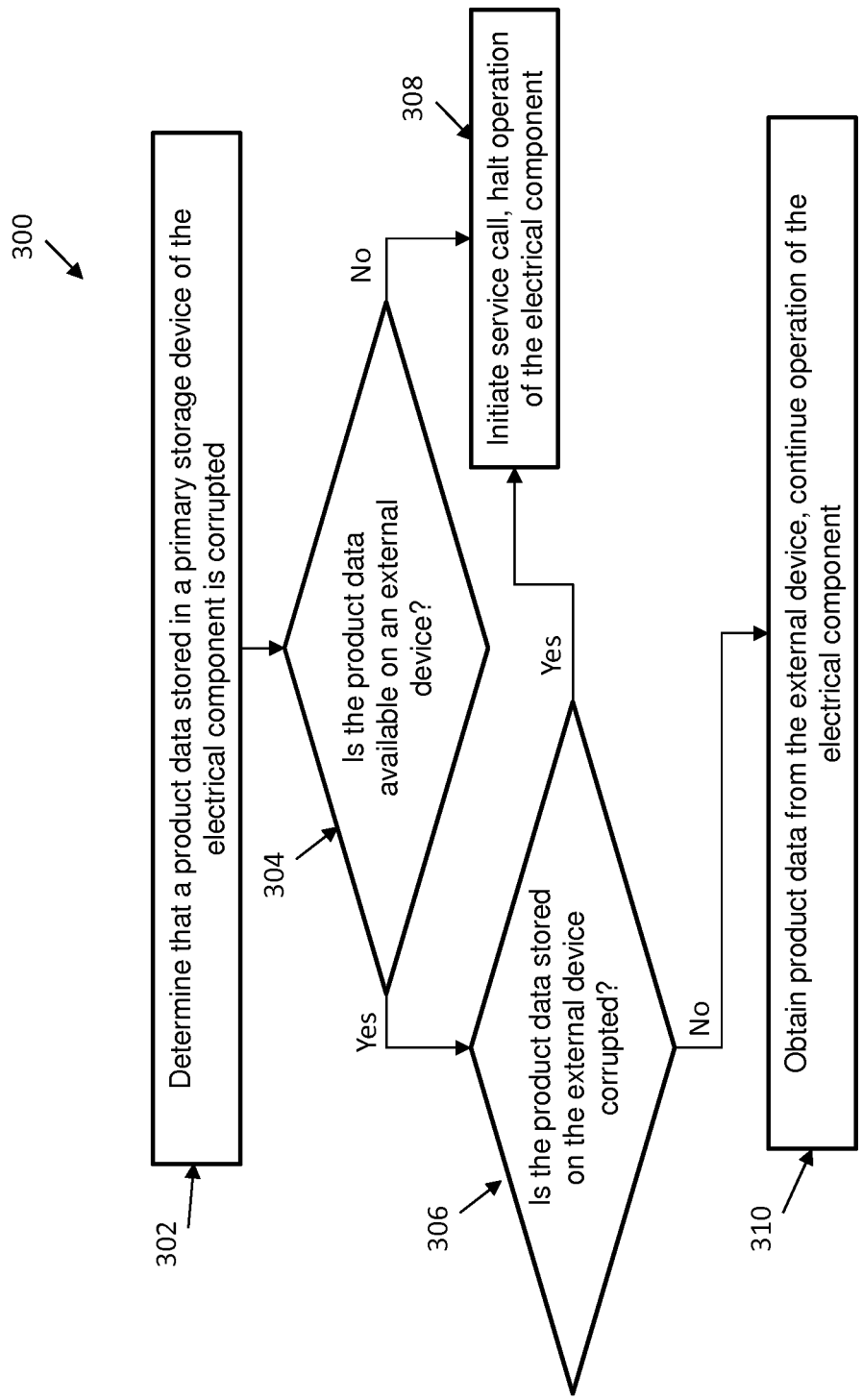
FIG. 3 is a flow diagram of a method for redundantly storing product data for an electronic component on an external device in accordance with an exemplary embodiment.

Referring now to FIG. 3, a flow diagram of a method 300 for redundantly storing product data for an electronic component on an external device in accordance with an exemplary embodiment is shown. As shown at block 302, the method 300 includes determining that product data stored in a primary storage device is corrupted. Next, as shown at decision block 304, the method 300 includes determining if the product data available on an external device. If the product data is available on an external device, the method 300 proceeds to decision block 306. If the product data is not available on an external device, the method 300 proceeds to block 308 and initiates a service call to repair or replace the electronic component and halts operation of the electronic component. As shown at decision block 306, the method 300 includes determining if the product data stored on the external device corrupted. If the product data stored on the external device is corrupted, the method 300 proceeds to block 308 and initiates a service call to repair or replace the electronic component and halts operation of the electronic component. Otherwise, the method 300 proceeds to block 310 and obtains product data from the external device to continue operation of the electronic component.

Figure 4:
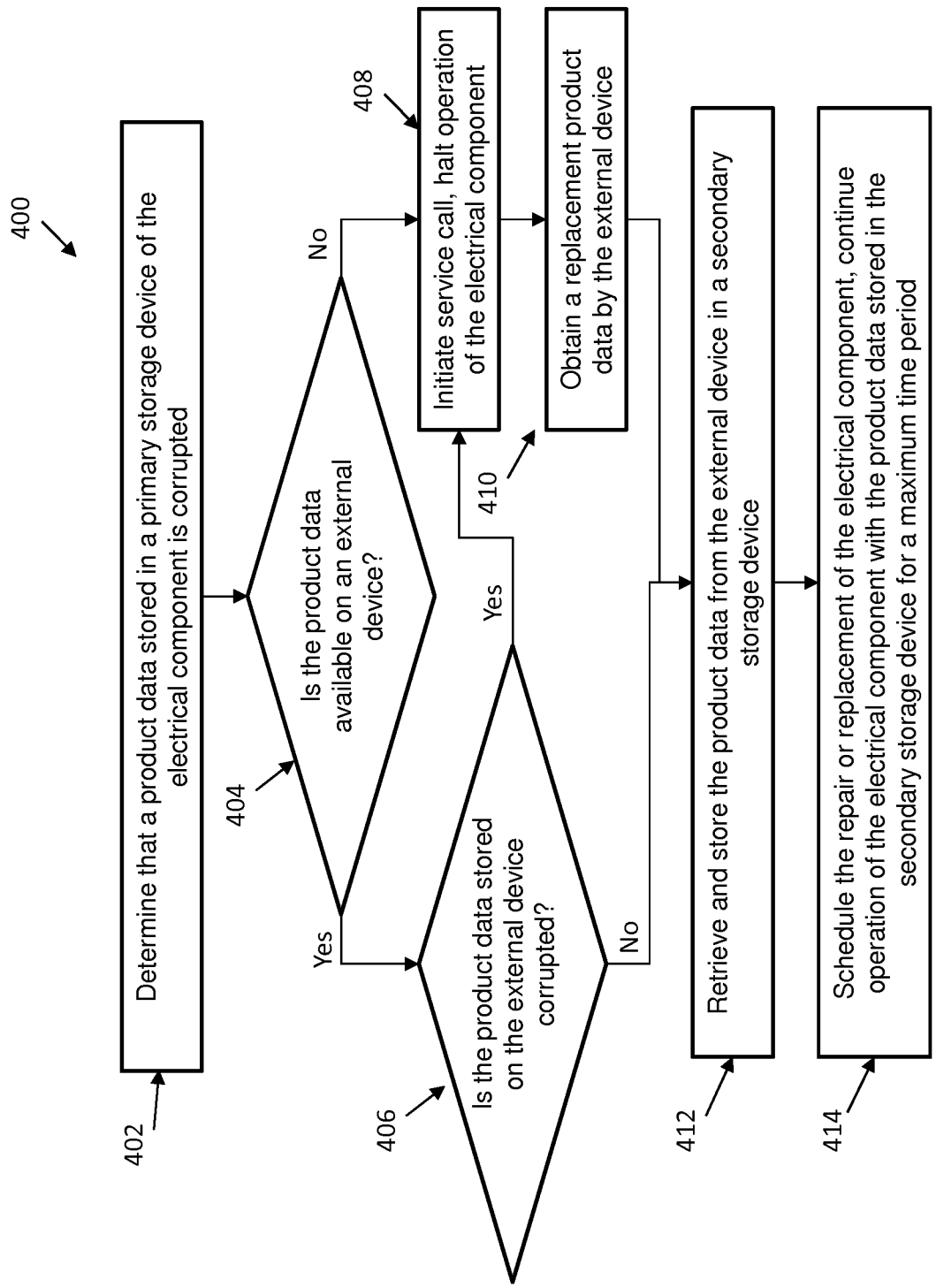
FIG. 4 is a flow diagram of another method for redundantly storing product data for an electronic component on an external device in accordance with an exemplary embodiment.

Referring now to FIG. 4, a flow diagram of another method 400 for redundantly storing product data for an electronic component on an external device in accordance with an exemplary embodiment is shown. As shown at block 402, the method 400 includes determining that product data stored in a primary storage device is corrupted. Next, as shown at decision block 404, the method 400 includes determining if the product data available on an external device. If the product data is available on an external device, the method 400 proceeds to decision block 406. If the product data is not available on an external device, the method 400 proceeds to block 408 and initiates a service call to repair or replace the electronic component and halts operation of the electronic component. As shown at decision block 406, the method 400 includes determining if the product data stored on the external device corrupted. If the product data stored on the external device is corrupted, the method 400 proceeds to block 408 and initiates a service call to repair or replace the electronic component and halts operation of the electronic component. Next, as shown at block 410, the method includes obtaining a replacement product data by the external device. As shown at block 412 the method 400 includes retrieving and storing the product data from the external device in a secondary storage device of the electronic component. The method 400 also includes scheduling a repair or replacement of the electronic component and continuing operation of the electronic component with the product data stored in the secondary storage device for a maximum time period.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for redundantly storing product data for an electronic component on an external device, the computer program product comprising:
   a non-transitory storage medium readable by a processing circuit and storing instructions for execution by the processing circuit for performing a method comprising:
   determining that product data stored in a primary storage device is corrupted, the product data comprising vital product data;
   determining whether the product data is available on the external device, wherein the external device is in communication with the electronic component via a short-range wireless communications protocol and the external device is one of a smartphone, tablet or laptop that is configured to download product data for the primary storage device from the Internet;
   based on a determination that the product data stored in the primary storage device is corrupted and that the product data is available on the external device, obtaining product data from the external device to continue operation of the electronic component, wherein the redundantly stored product data is available for a period of time that begins when it is determined that the product data in the primary storage device is corrupted and ends after a predetermined time period has elapsed; and
   based on a determination that the product data stored in the primary storage device is corrupted and that the product data is not available on the external device, initiating a service call to repair or replace the electronic component and halting operation of the electronic component.

2. The computer program product of claim 1, further comprising determining whether the product data stored on the external device is corrupted, wherein it is determined that the product data is not available on the external device based at least in part on determining that the product data stored in the external device is corrupted and it is determined that the product data is available on the external device based at least in part on determining that the product data stored in the external device is not corrupted.

3. The computer program product of claim 2, further comprising obtaining replacement product data by the external device based on a determination that the product data stored on the external device is corrupted.

4. The computer program product of claim 1, further comprising storing the product data obtained from the external device in a secondary storage device disposed on the electronic component.

5. A system for redundantly storing product data for an electronic component on an external device, comprising:
   a processor disposed on the electronic component, the processor configured to:
   determine that product data stored in a primary storage device of the electronic component is corrupted, the product data comprising vital product data;
   determine whether the product data is available on the external device, wherein the external device is in communication with the electronic component via a short-range wireless communications protocol and the external device is one of a smartphone, tablet or laptop that is configured to download product data for the primary storage device from the Internet;
   based on a determination that the product data stored in the primary storage device is corrupted and that the product data is available on the external device, obtain product data from the external device to continue operation of the electronic component, wherein the redundantly stored product data is available for a period of time that begins when it is determined that the product data in the primary storage device is corrupted and ends after a predetermined time period has elapsed; and
   based on a determination that the product data stored in the primary storage device is corrupted and that the product data is not available on the external device, initiating a service call to repair or replace the electronic component and halting operation of the electronic component.

6. The system of claim 5, wherein the processor is further configured to determine whether the product data stored on the external device is corrupted, wherein it is determined that the product data is not available on the external device based at least in part on determining that the product data stored in the external device is corrupted and it is determined that the product data is available on the external device based at least in part on determining that the product data stored in the external device is not corrupted.

7. The system of claim 6, wherein the processor is further configured to instruct the external device to obtain replacement product data based on a determination that the product data stored on the external device is corrupted.

8. The system of claim 5, wherein the short-range wireless communications protocol includes near field communications.

9. The system of claim 5, wherein the short-range wireless communications protocol includes Bluetooth.

10. The computer program product of claim 1, wherein the short-range wireless communications protocol includes near field communications.

11. The computer program product of claim 1, wherein the shortrange wireless communications protocol includes Bluetooth.

12. A method for redundantly storing product data for an electronic component on an external device, the method comprising:
  determining that product data stored in a primary storage device is corrupted, the product data comprising vital product data;
  determining whether the product data is available on the external device, wherein the external device is in communication with the electronic component via a short-range wireless communications protocol and the external device is one of a smartphone, tablet or laptop that is configured to download product data for the primary storage device from the Internet;
  based on a determination that the product data stored in the primary storage device is corrupted and that the product data is available on the external device, obtaining product data from the external device to continue operation of the electronic component, wherein the redundantly stored product data is available for a period of time that begins when it is determined that the product data in the primary storage device is corrupted and ends after a predetermined time period has elapsed; and
  based on a determination that the product data stored in the primary storage device is corrupted and that the product data is not available on the external device, initiating a service call to repair or replace the electronic component and halting operation of the electronic component.

13. The method of claim 12, further comprising determining whether the product data stored on the external device is corrupted, wherein it is determined that the product data is not available on the external device based at least in part on determining that the product data stored in the external device is corrupted and it is determined that the product data is available on the external device based at least in part on determining that the product data stored in the external device is not corrupted.

14. The method of claim 13, further comprising obtaining replacement product data by the external device based on a determination that the product data stored on the external device is corrupted.

15. The method of claim 12, further comprising storing the product data obtained from the external device in a secondary storage device disposed on the electronic component.

16. The method of claim 12, wherein the short-range wireless communications protocol includes near field communications.

17. The method of claim 12, wherein the short-range wireless communications protocol includes Bluetooth.

* * * * *